United States Patent [19]

Hattori et al.

[11] Patent Number: 4,835,505

[45] Date of Patent: May 30, 1989

[54] MAGNETIC RING FOR DETECTING THE ROTATION OF AN OBJECT

[75] Inventors: Kenji Hattori, Tochigi; Hiroshi Tanaka; Shinichi Tanaka, both of Saitama, all of Japan

[73] Assignees: Honda Giken Kogyo Kabushiki; Dainippon Ink & Chemicals, Inc., both of Tokyo, Japan

[21] Appl. No.: 889,139

[22] Filed: Jul. 23, 1986

[30] Foreign Application Priority Data

Jul. 26, 1985 [JP] Japan .............................. 60-163824

[51] Int. Cl.$^4$ .............................................. H01F 7/02
[52] U.S. Cl. ...................................... 335/302; 35/284
[58] Field of Search ................. 331/284, 302, 303, 306

[56] References Cited

U.S. PATENT DOCUMENTS 4,549,157 10/1985 Loubier ............................... 335/303
4,555,685 11/1985 Maruyama ........................... 335/303

Primary Examiner—George Harris
Attorney, Agent, or Firm—Skjerven, Morrill, MacPherson, Franklin & Friel

[57] ABSTRACT

A ring to be attached to a rotating body for producing a magnetic signal in cooperation with a magnetic sensor relative to which the rotating body rotates, comprising: a magnetic ring member having an alternating magnetic property along its circumference consisting of synthetic resin in which magnetic material is dispersed; and a reinforcement ring member which is made of synthetic resin material and substantially surrounds the magnetic ring member. Alternatively, the reinforcement ring may consist of a metallic band which extends the full circumferential surface of the ring. By thus reinforcing the resinous magnetic material, the cost of the ring can be reduced, and the increased mechanical strength of the ring allows easy handling and effective press fitting of the ring. By forming the ring with a plurality of arcuate portions, the stocking and installing of the ring is facilitated.

19 Claims, 9 Drawing Sheets

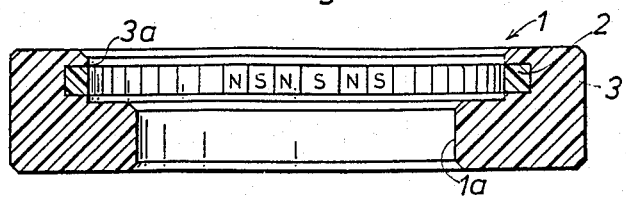
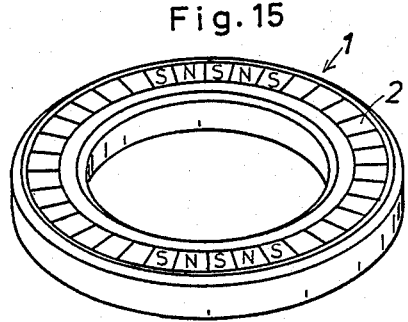
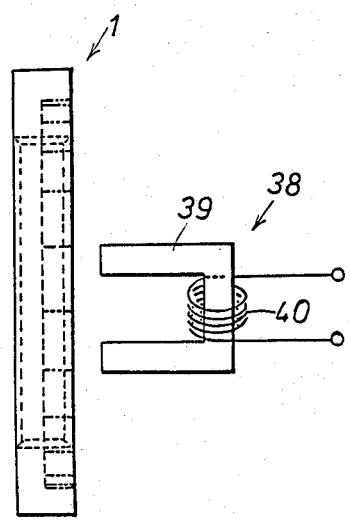
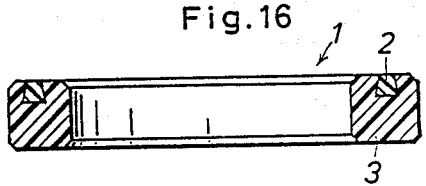
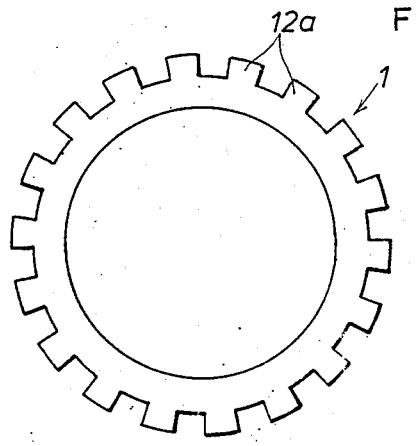
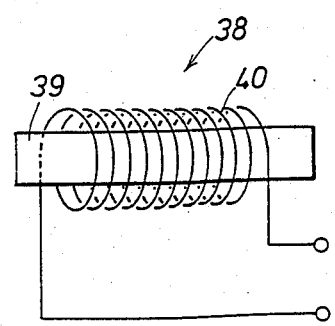

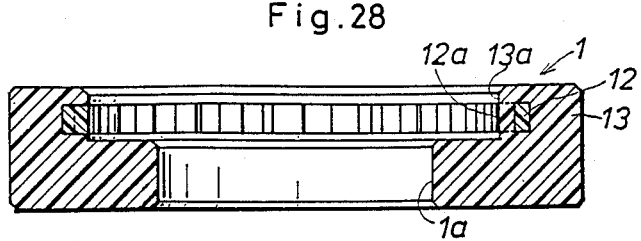
Fig. 28
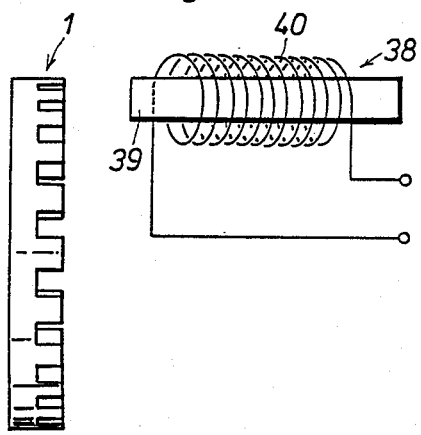
Fig. 31
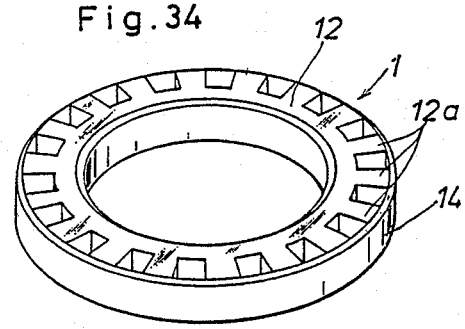
Fig. 34
Fig. 35
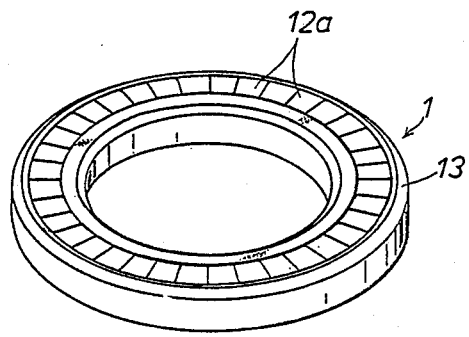
Fig. 32
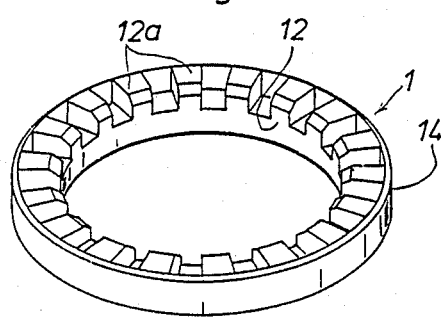
Fig. 36
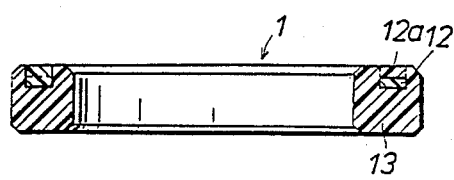
Fig. 33
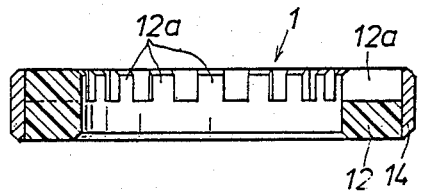
Fig. 37

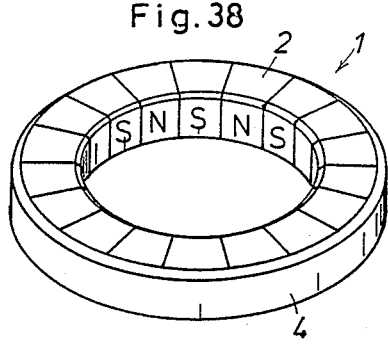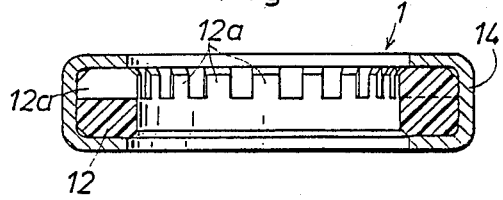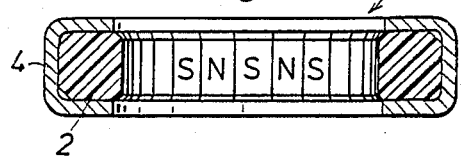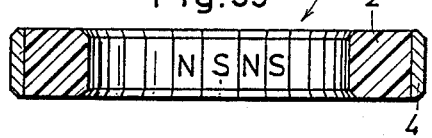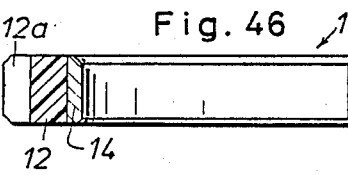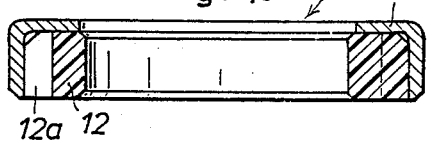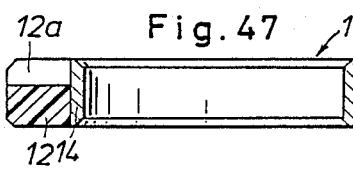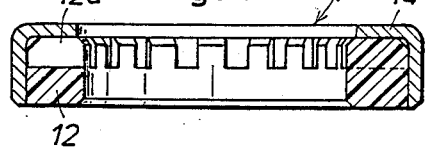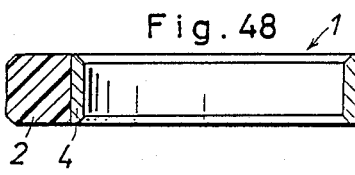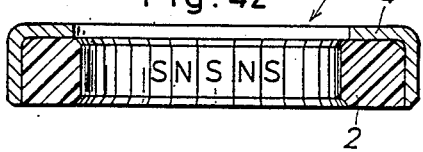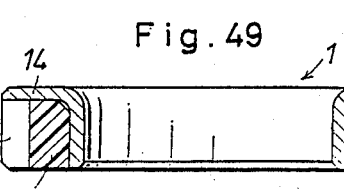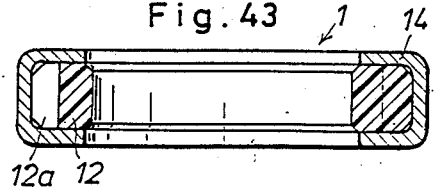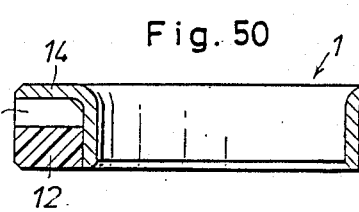

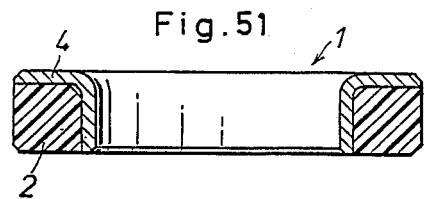
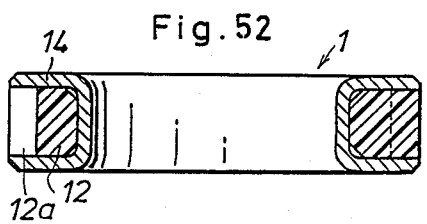
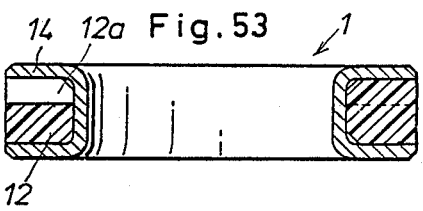
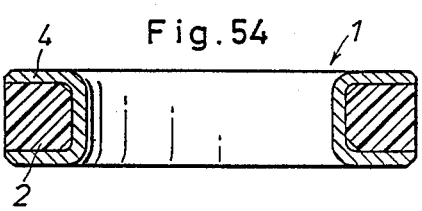
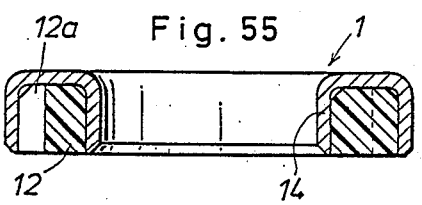
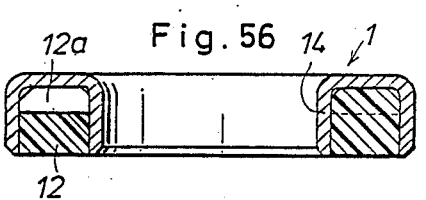
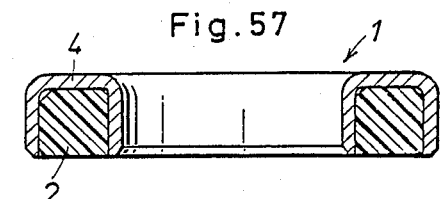
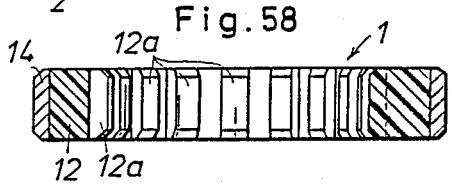
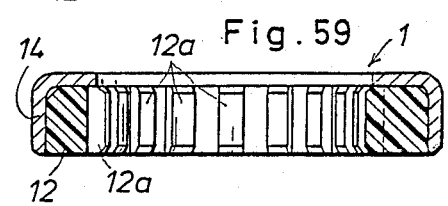
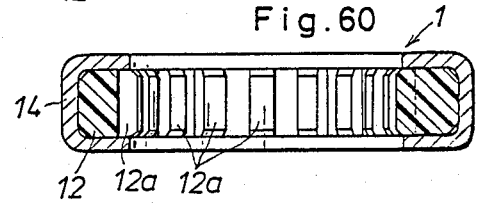
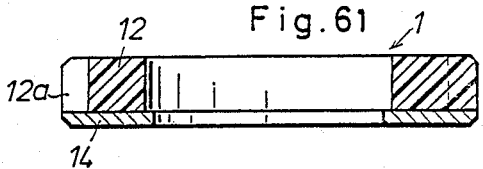
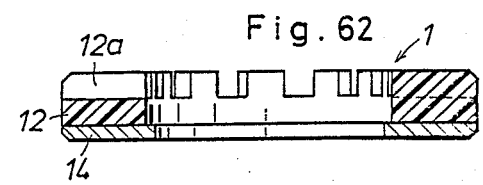
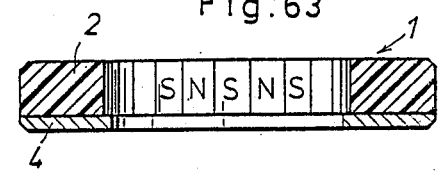

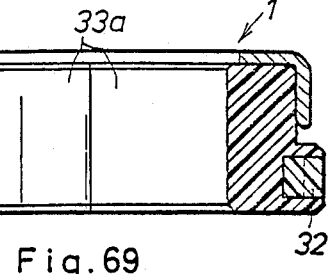
Fig. 68
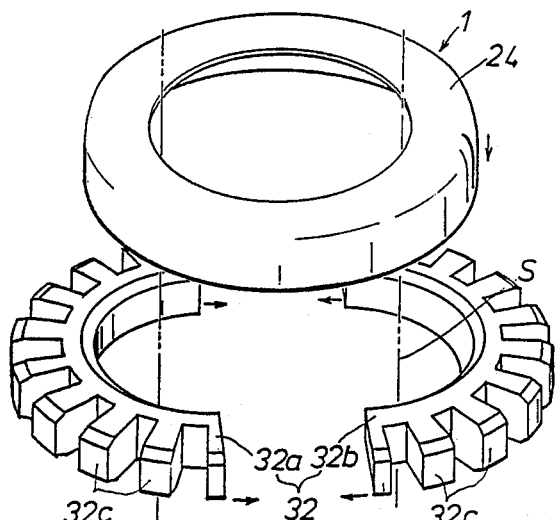
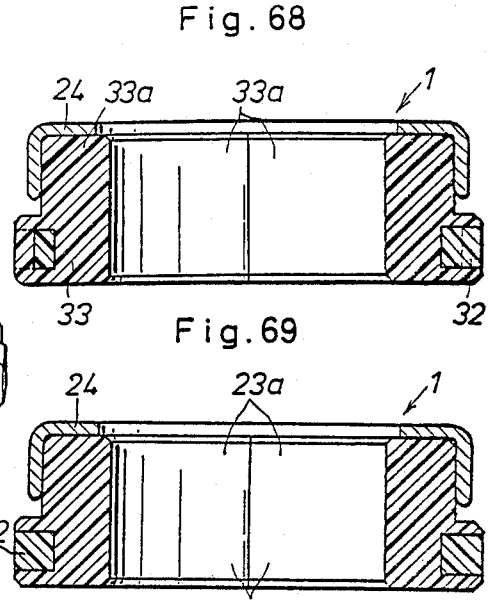
Fig. 65
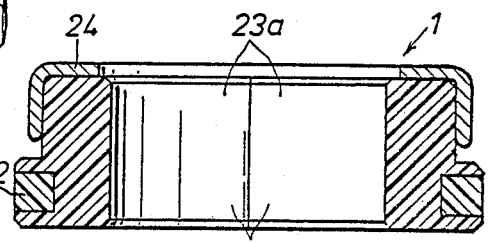
Fig. 69
Fig. 70
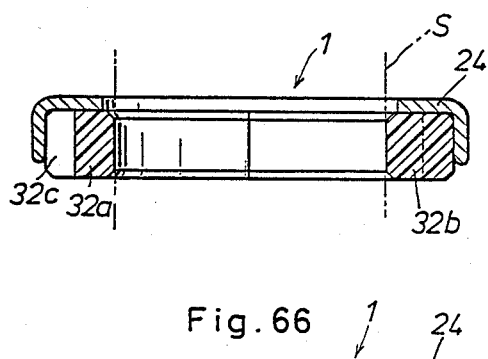
Fig. 66
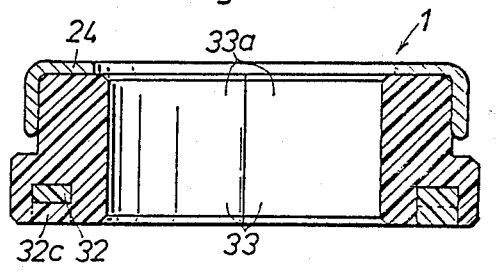
Fig. 67
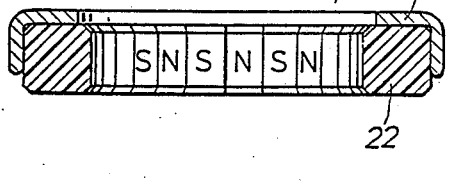
Fig. 71
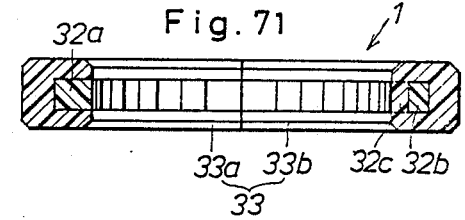
Fig. 72
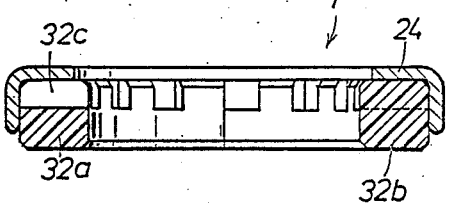

MAGNETIC RING FOR DETECTING THE ROTATION OF AN OBJECT

BACKGROUND OF THE INVENTION

The present invention relates to a magnetic ring for detecting the rotation of an object and in particular to such a magnetic ring making use of synthetic resin material in which magnetic particles are dispersed.

It is often necessary to electrically detect the rotation or rotational speed of an object. For instance, it is often desired to measure the rotational speed of a shaft in industrial applications, and it is often desirable to measure the rotational speed of a wheel in automotive applications. For instance, in evaluating the speed of an automobile, one can obtain a highly accurate speed reading by measuring the rotational speed of a wheel itself; and it is absolutely necessary to measure the rotational speed of a wheel in anti-skid control of a brake system.

In such applications, it has been common to use a toothed gear which is mounted on a rotating object and to measure its rotational speed by counting pulses generated from a magnetic induction device placed adjacent to the toothed gear. Since such a toothed gear is typically press fitted into a bore or onto a shaft, it must be capable of withstanding the stress arising from such a press fitting, and it is typically made of a metal such as steel. Since hobbing of a gear which is a fairly time consuming and expensive process, is necessary and a substantial dimensional precision is necessary for satisfactory press fitting, such a metallic ring for detecting rotational speed tends to be costly.

Magnetic material consisting of synthetic resin in which ferromagnetic powder is dispersed is known and it can be formed into a ring having a plurality of gear teeth or magnetized to have alternating magnetic poles along its circumference at very low cost. Furthermore, it is substantially lighter in weight than a conventional toothed gear ring made of steel. However, such material lacks the mechanical strength required for press fitting. Such material, particularly in the, form of a toothed gear, is prone to damage during assembly and in use, and its reliability and durability are insufficient for practical purpose.

BRIEF SUMMARY OF THE INVENTION

In view of such problems of the prior art, a primary object of the present invention is to provide a ring having a magnetically alternating property along its circumference which is inexpensive for manufacture and is yet durable and reliable.

Another object of the present invention is to provide a ring for detecting the rotation of an object which is easy to install.

According to the present invention such objects are accomplished by providing a ring to be attached to a rotating body for producing a magnetic signal in cooperation with a magnetic sensor relative to which the rotating body rotates, comprising: a magnetic ring member having an alternating magnetic property along its circumference consisting of synthetic resin in which magnetic material is dispersed; and a reinforcement ring member which is made of synthetic resin material and substantially surrounds the magnetic ring member.

The resinous magnetic ring member having a magnetically alternating property along its circumference according to the present invention may consist of a ferromagnetic ring having alternating magnetic poles along its inner circumference, outer circumference or end surface which is made by molding composite magnetic material which is in turn made by uniformly mulling synthetic resin material such as polyamide, polyolefin and ethylene copolymer materials with magnetic powder such as barium ferrite, strontium ferrite and rare earth magnetic powder, optionally with some additives.

Such a resinous permanent magnetic ring member may typically have ten or more N and S poles, and preferably 50 to 200 poles along its circumference. The weight ratio of the synthetic resin (I) to the magnetic powder (II) in this composite magnetic material may be (I)/(II)=40/60 to 5/95, preferably (I)/(II)=20/80 to 8/92.

Preferably, this resinous permanent magnetic ring member is embedded in a synthetic resin ring for reinforcement to endow the thus formed ring for detecting the rotation of an object with necessary mechanical strength and integrity which are necessary for press fitting and easy handling. The material for this synthetic resin ring may consist of, for instance, polyethylene, polypropylene, polyvinyl chloride, styrene-butadiene copolymer, AS resin, ABS resin, polyamide, polyacetal, polycarbonate, polyethylene phthalate, polyphenylene sulfide, polyphenylene ether, polysulfone, thermoplastic polyurethane, etc. It is preferable to reinforce such synthetic resin with glass fiber or other reinforcing material. It is also possible to reinforce the synthetic resin ring with a metallic ring, extending along its full circumference, which may be press fitted to or insert molded with the synthetic resin ring.

Alternatively, the resinous permanent magnetic ring member having alternating magnetic poles along its circumference according to the present invention may be replaced by a toothed gear ring having a magnetic property as well as a plurality of teeth along its inner circumference, outer circumference or end surface which is made by molding composite magnetic material which is in turn made by uniformly mulling synthetic resin material such as polyamide, polyolefin and ethylene copolymer materials with magnetic material such as soft ferrite, iron, iron alloy and nickel alloy powder, optionally with some additives. The magnetic permeability of this magnetic material may be 5.0 or greater, or preferably 10.0 or greater.

According to another aspect of the present invention, the circumferential surface of the ring for detecting the rotation of an object is polygonal in shape and is thus prevented from slipping relative to the object to which this ring is fitted.

According to yet another aspect of the present invention, the reinforcement ring member is made of metal or alloy material, instead of synthetic resin, and extends along the full or whole circumference of the magnetic ring member.

According to yet another aspect of the present invention, there is provided a ring to be attached to a rotating body for producing a magnetic signal in cooperation with a magnetic sensor relative to which the rotating body rotates, comprising: a magnetic ring member having an alternating magnetic property along its circumference which comprises at least two arcuate parts forming a complete circle through mutual cooperation thereof, consisting of synthetic resin in which magnetic material is dispersed; and fastening means for holding the arcuate parts together in the state of a complete ring. This not only facilitates the work involved in assembling and replacing the ring but also improves the convenience in stocking such rings as component parts.

BRIEF DESCRIPTION OF THE DRAWINGS

The present invention will now be shown and described in terms of concrete embodiments thereof with reference to the appended drawings, in which:

FIGS. 4 to 13 are sectional views showing different embodiments of the magnetic ring having alternating magnetic poles along its circumference according to the present invention;

FIG. 14 is an illustrative view showing the principle of detecting the rotation of a wheel using a magnetic ring having alternating magnetic poles along its end surface for detecting the rotation of the wheel according to the present invention;

FIGS. 15 and 16 are a perspective view and a sectional view of the magnetic ring of FIG. 14, respectively;

FIG. 17 is an illustrative view showing the principle of detecting the rotation of a wheel using a magnetic ring having gear teeth along its circumference for detecting the rotation of the wheel according to the present invention;

FIGS. 20 to 30 are sectional views showing different embodiments of the magnetic ring having gear teeth along its circumference according to the present invention;

FIG. 31 is an illustrative view showing the principle of detecting the rotation of a wheel using a magnetic ring having crown gear teeth along its end surface for detecting the rotation of the wheel according to the present invention;

FIGS. 32 and 33 are a perspective view and a sectional view of the magnetic ring of FIG. 31, respectively;

FIGS. 34 and 35 are a perspective view and a sectional view of yet another embodiment of the magnetic ring according to the present invention, respectively;

FIGS. 36 and 37 are a perspective view and a sectional view of yet another embodiment of the magnetic ring according to the present invention, respectively;

FIGS. 38 and 39 are a perspective view and a sectional view of yet another embodiment of the magnetic ring according to the present invention, respectively;

FIGS. 40 to 63 are sectional views showing different embodiments of the magnetic ring having a metallic reinforcement ring along its circumference according to the present invention;

FIG. 64 is an exploded perspective view of an embodiment of the magnetic ring consisting of a pair of semicircular halves according to the present invention;

FIGS. 65 to 76 are sectional views of different embodiments of the magnetic ring consisting of a pair of semicircular halves according to the present invention;

DETAILED DESCRIPTION OF THE EMBODIMENTS

Various embodiments of the magnetic ring for generating a magnetic signal according to the present invention are described in the following section with reference to the appended drawings.

Figure 1:
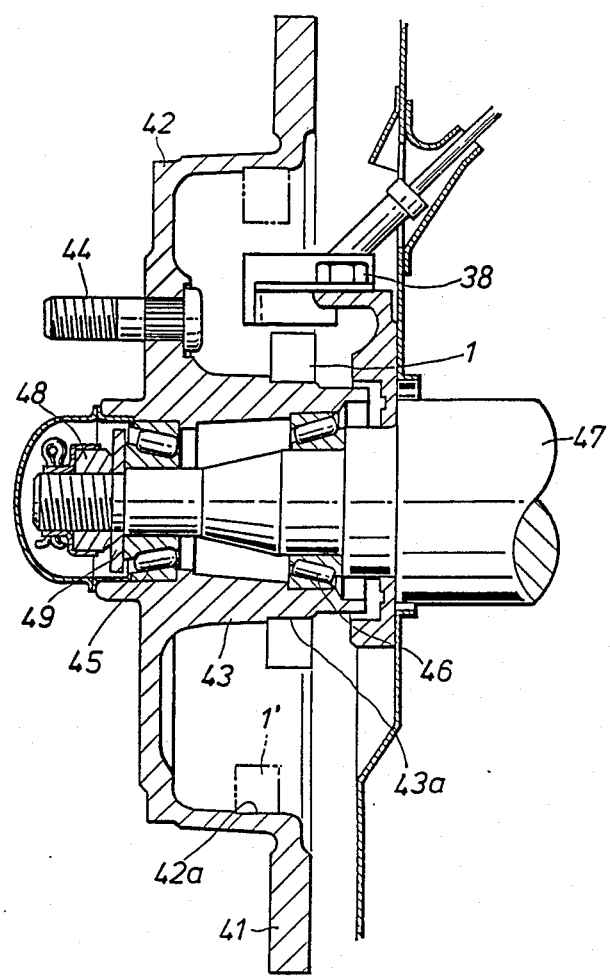
FIG. 1 is a sectional view of a non-driven wheel of a four-wheel automobile equipped with a magnetic ring for detecting the rotation of the wheel according to the present invention.

FIG. 1 shows a structure for supporting a non-driven wheel of an automobile to which a magnetic ring for detecting the rotation of a wheel according to the present invention can be applied. The central portion of a wheel disc 42 having a flange 41 for a disc brake system is integrally provided with an annular boss 43 which projects inwardly towards the center of the automobile. The inner circumferential surfaces of a central bore of this boss 43 is rotatably supported by the free end of an axle shaft 47 by way of a pair of tapered roller bearings 45 and 46. Further, a nut 48 is threaded to the outer most part of the free end of this axle shaft 47 by way of a washer 49 and holds the mentioned component parts together. Numeral 44 denotes one of a number of stud bolts for securing a wheel, not shown in the drawing, to the wheel disc 42.

A ring for magnetically detecting the rotation of a wheel according to the present invention may be fitted either onto the outer circumferential surface 43a of the boss 43 as denoted by numeral 1 or into an inner circumferential surface 42a of a bore of the wheel disc 42 as denoted by numeral 1', and a magnetic sensor 38 is fixedly secured to a car body portion adjacent to the ring 1, 1'.

Figure 2:
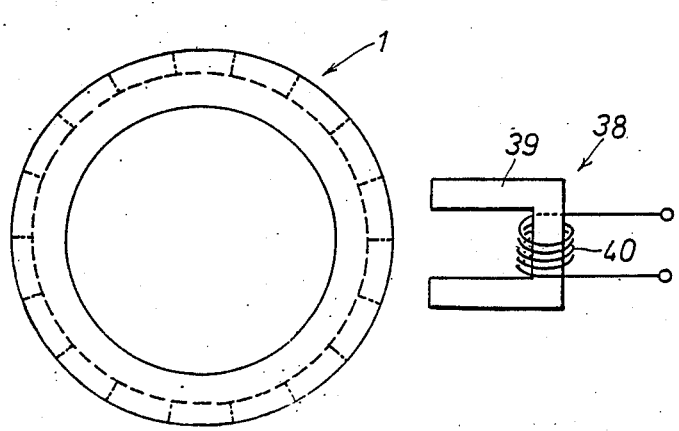
FIG. 2 is an illustrative view showing the principle of detecting the rotation of the wheel using a magnetic ring having alternating magnetic poles for detecting the rotation of the wheel according to the present invention.

FIG. 2 is an illustrative view showing the working principle of the magnetic ring for detecting the rotation of an object according to the present invention. The ring 1 is provided with alternating magnetic poles at an equal interval along its outer circumferential surface, while the magnetic sensor 38 comprises a C-shaped iron core 39 and a coil 40 wound on this iron core 39. Therefore, as the ring 1 rotates with the wheel disc 42, a train of electric current pulses corresponding to the number of magnetic poles passing through the vicinity of the iron core 39 are induced in the coil 40 and the rotational speed of the ring 1 or the wheel disc 42 can be evaluated by counting these pulses.

Figure 3:
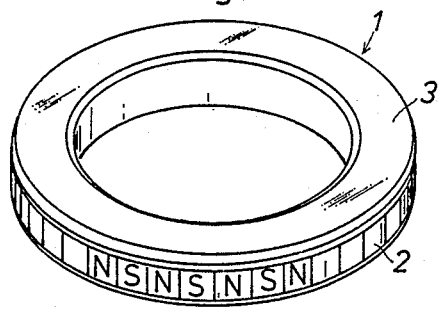
FIG. 3 is a perspective view of an embodiment of the magnetic ring according to the present invention.
Figure 4:
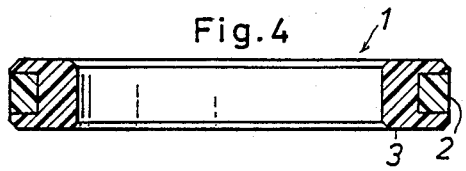

FIGS. 3 and 4 show the first embodiment of the ring for detecting the rotation of an object according to the present invention. According to this embodiment, a permanent magnet ring 2 which is magnetized so that N and S poles appear alternatingly along its outer circumferential surface is embedded in the middle part of the outer circumferential surface of a synthetic resin ring 3.

The permanent magnet ring 2 may be made by press forming or extruding resin material containing ferromagnetic powder dispersed therein in a magnetic field into a magnetically either isotropic or anisotropic state, and demagnetizing it. Thereafter, this resinous magnetic ring 2 is placed in a metallic die and is integrally molded with a synthetic resin compound such as polyphenylene sulfide resin compound, preferably containing reinforcing material such as glass fiber, by compression molding or injection molding. Thus, the permanent magnet ring 2 is embedded in the synthetic resin ring 3. Then, the resinous permanent magnet ring 2 is magnetized according to a desired magnetization pattern with a magnetizer.

Since the permanent magnet ring 2 is embedded in the synthetic resin ring 3 which has a much greater mechanical strength than the permanent magnet ring 2, the ring 1 for detecting rotation has a sufficient mechanical strength to be press fitted onto the shaft 47 as denoted by numeral 1 in FIG. 1. Furthermore, the ring 1 thus formed is much lighter in weight than a similar conventional ring made of steel or other metallic or oxide material.

In the following description of the different embodiments of the present invention, those parts corresponding to the previously described embodiments are denoted by like numerals and their detailed description is omitted since such description would be redundant and a person skilled in the art would not be hindered by such an omission in understanding the present invention.

Figure 5:
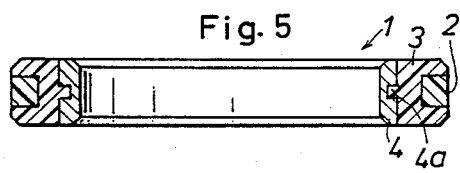

According to the embodiment shown in FIG. 5, a metallic ring 4 for reinforcement covers the whole inner circumferential surface of a synthetic resin ring 3, made of synthetic resin material optionally containing reinforcing material such as glass fiber, in which a resinous permanent magnet ring 2 is embedded in a manner similar to that in the embodiment shown in FIGS. 3 and 4. The metallic ring 4 may be attached to the ring 1 for instance by insert molding and a groove 4a provided in the metallic ring 4 assures a strong bond between the metallic ring 4 and the synthetic resin ring 3. Therefore, this embodiment provides an extremely high mechanical strength for press fitting.

Figure 6:
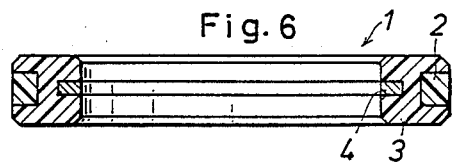

FIG. 6 shows yet another embodiment of the present invention. According metallic ring 4 having a relatively small height is embedded in the inner circumferential surface of a synthetic resin ring 3 in which a permanent magnet ring 2 is embedded.

Figure 7:
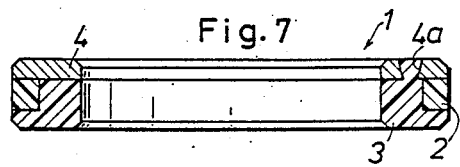

In the embodiment shown in FIG. 7, a metallic ring 4 for reinforcement is attached to an end surface of a synthetic resin ring 3 having a permanent magnet ring 2 embedded in the outer circumferential surface thereof, and holes 4a provided in the metallic ring 4 assure secure bonding between the metallic ring 4 and the synthetic resin ring 3.

Figure 8:
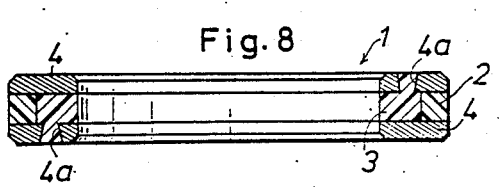

In the embodiment shown in FIG. 8, a pair of metallic rings 4 are attached to either end surface of a synthetic resin ring 3 in which a resinous permanent magnet ring 2 is embedded in a manner similar to that in the embodiment shown in FIG. 7, and holes 4a provided in these metallic rings 4 assure secure bonding between the metallic rings 4 and the synthetic resin ring 2.

Figure 9:
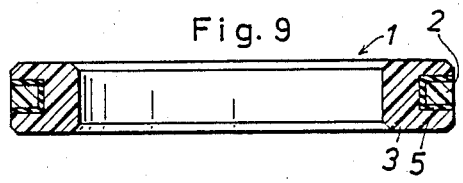

In the embodiment shown in FIG. 9, a cushion or buffer layer 5 which may be made, for instance, of natural or synthetic rubber such as silicone rubber is interposed between a synthetic resin ring 3 and a resinous permanent magnet ring 2. This cushion, layer 5 protects the resinous permanent magnetic ring 2 from the stress caused in the synthetic resin ring 3 when this ring 1 is press fitted, by preventing the transmission of stress from the synthetic resin ring 3 to the resinous magnetic ring 2.

Figure 10:
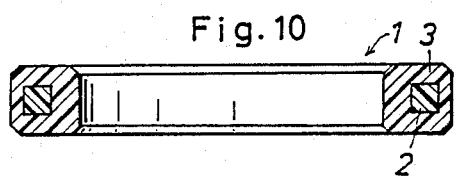

In the embodiment shown in FIG. 10, a resinous permanent magnet ring 2 is embedded and wholly buried in the central portion of a synthetic resin ring 3. Therefore, according to this embodiment, the permanent magnet ring 2 is very well protected from the influences of external elements.

Figure 11:
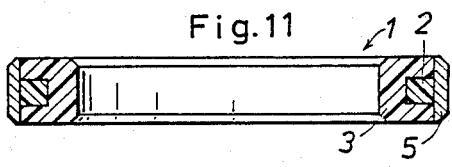

In the embodiment shown in FIG. 11, a resinous permanent magnetic ring 2 is embedded in the outer circumferential surface of a synthetic resin ring 3 and is further surrounded by a metallic ring 5 which not only protects the resinous permanent magnet ring 2 but also increases the overall mechanical strength of the ring 1.

The embodiments which have been described so far are adapted to be fitted onto a shaft as denoted by numeral 1 in FIG. 1.

Figure 12:
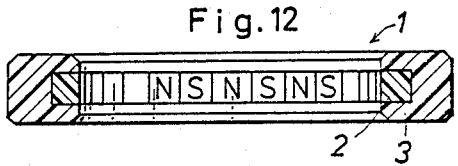

In the embodiment shown in FIG. 12, a resinous permanent magnet ring 2 is embedded in the inner circumferential surface of a synthetic resin ring 3. The ring 1 of this embodiment is adapted to be fitted into a bore as denoted by numeral 1' in FIG. 1.

In the embodiment shown in FIG. 13, an end surface of a synthetic resin ring 3 has an annular step 3a and a resinous permanent magnetic ring 2 having an inner circumferential surface that is magnetized into N and S poles in an alternating manner is embedded in the vertical wall surface of this annular step 3a. The ring 1 of this embodiment is adapted to be fitted onto an outer circumferential surface of a rotating object at its inner circumferential surface 1a having a smaller diameter that the vertical wall surface of the annular step 3a.

FIG. 14 shows yet another embodiment of the present invention in which alternating magnetic poles appear in an end surface of a ring 1 for detecting the rotation of an object and, therefore, a magnetic sensor 38 comprising a C-shaped iron core 39 and a coil 40 wound thereon is disposed adjacent to the end surface of the ring 1. FIGS. 15 and 16 show the ring 1 of FIG. 14 in greater detail. According to this embodiment, a resinous permanent magnet ring 2 which is magnetized so that N and S poles appear alternatingly along its circumference is embedded in the end surface of a synthetic resin ring 3. The resinous permanent magnet ring 2 is trapezoidal in cross section and is thus positively attached to the synthetic resin ring 1.

Figure 18:
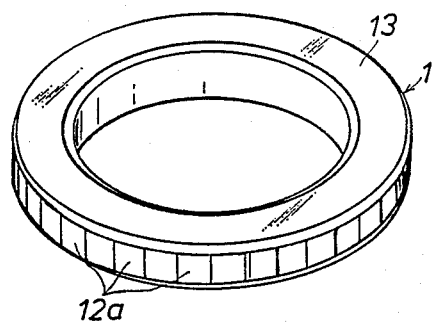
FIGS. 18 and 19 are a perspective view and a sectional view of the magnetic ring of FIG. 17, respectively.
Figure 19:
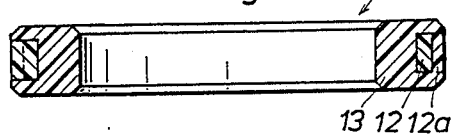

FIG. 17 shows yet another embodiment of the present invention in which a plurality of gear teeth 12a are formed along the outer circumferential surface of a ring 1 for detecting the rotation of an object and, therefore, a magnetic sensor 38 comprising an iron core 39 made of a permanent magnet and a coil 40 wound thereon is disposed adjacent to the outer circumferential surface of the ring 1. FIGS. 18 and 19 show the ring 1 of FIG. 17 in greater detail. According to this embodiment, a resinous magnetic ring 12 which consists of synthetic resin material such as polyamide and magnetic material such as ferrite dispersed therein is formed into a toothed gear having the teeth 12a and is embedded in the outer circumferential surface of a synthetic resin ring 13 which may be made of polypropylene. The inner circumferential surface of the synthetic resin ring 13 is adapted to be press fitted onto a rotating object such as the shaft 47 shown in FIG. 1.

Figure 20:
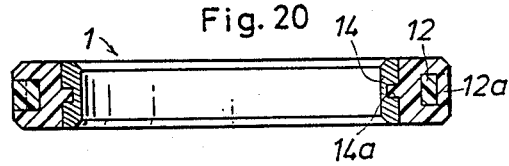

According to the embodiment shown in FIG. 20, a metallic ring 14 for reinforcement covers the whole inner circumferential surface of a synthetic resin ring 13 in which a resinous magnetic ring 12 having a plurality of gear teeth 12a is embedded in a manner similar to that of FIGS. 18 and 19. The metallic ring 14 may be attached to the synthetic resin ring 13 for instance by insert molding and a groove 14a provided in the metallic ring 14 assures a strong bond between the metallic ring 14 and the synthetic resin ring 13. Therefore, this embodiment provides an extremely high mechanical strength for press fitting.

Figure 21:
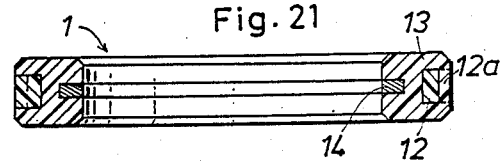

FIG. 21 shows yet an embodiment of the present invention. According to this embodiment, a metallic ring 14 having a relatively small height is embedded in the inner circumferential surface of a synthetic resin ring 13, but this embodiment is otherwise similar to that shown in FIG. 20.

Figure 22:
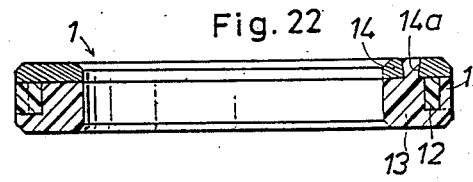

In the embodiment shown in FIG. 22, a metallic ring 14 for reinforcement is attached to an end surface of a synthetic resin ring 13, and holes 14a provided in the metallic ring 14 assure secure bonding between the metallic ring 14 and the synthetic resin ring 13. Otherwise, this embodiment is similar to that shown in FIG. 21.

Figure 23:
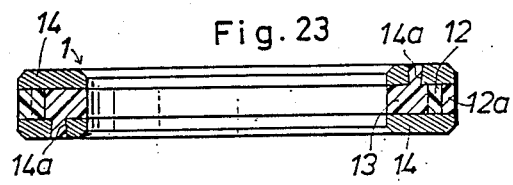

In the embodiment shown in FIG. 23, a pair of metallic rings 14 are attached to either end surface of a synthetic resin ring 13, and holes 14a provided in these metallic rings 14 assure secure bonding between the metallic rings 14 and the synthetic resin ring 13. Otherwise, this embodiment is otherwise similar to that shown in FIG. 22.

Figure 24:
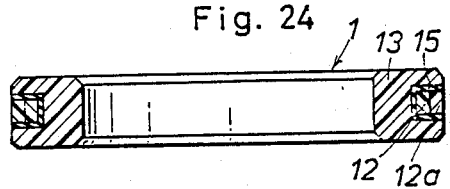

In the embodiment shown in FIG. 24, a cushion or buffer layer 15 which may be made, for instance, of natural or synthetic rubber such as silicone rubber is interposed between a synthetic resin ring 13 and a resinous magnetic ring 12. This cushion layer 15 protects the resinous magnetic ring 12 from the stress caused in the synthetic resin ring, 13 when this ring 1 is press fitted, by preventing the transmission of stress from the synthetic resin ring 13 to the resinous magnetic ring 12.

Figure 25:
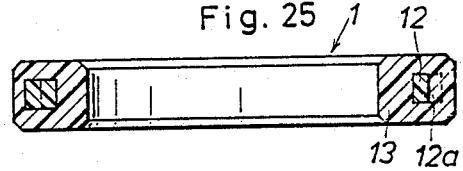

In the embodiment shown in FIG. 25, a resinous magnetic ring 12 is embedded and wholly buried in the central portion of a synthetic resin ring 13. Therefore, according to this embodiment, the toothed resinous magnetic ring 12 is very well protected from the influences of external elements.

Figure 26:
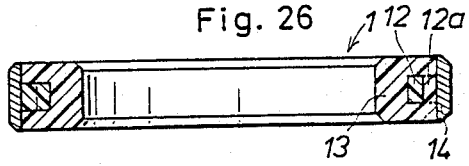

In the embodiment shown in FIG. 26, a resinous magnetic ring 12 is embedded in the outer circumferential surface of a synthetic resin ring 13 and is further surrounded by a metallic ring 14 which not only protects the resinous permanent magnetic ring 12 but also increases the overall mechanical strength of the ring 1.

Figure 27:
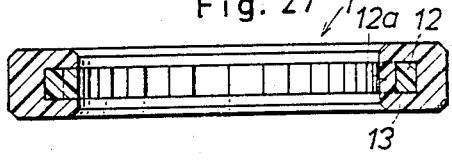

In the embodiment shown in FIG. 27, a resinous magnetic ring 12 is embedded in the inner circumferential surface of a synthetic resin ring 13. The ring 1 of this embodiment is adapted to be fitted into a bore as denoted by numeral 1' in FIG. 1.

In the embodiment shown in FIG. 28, an end surface of a ring 1 made of synthetic resin has an annular step 13a and a resinous magnetic ring 12 having an inner circumferential surface that is provided with gear teeth 12a is embedded in the vertical wall surface of this annular step 13a. The ring 1 of this embodiment is adapted to be fitted onto an outer circumferential surface of a rotating object at its inner circumferential surface 1a having a smaller diameter than the vertical wall surface of the annular step 13a.

Figure 29:
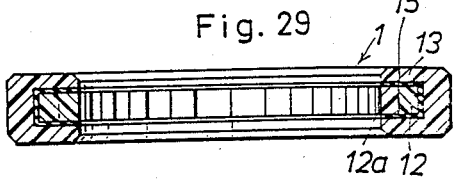

The embodiment shown in FIG. 29 is similar to that shown in FIG. 24, but the resinous magnetic ring 12 is embedded in the inner circumferential surface of a synthetic resin ring 13 instead of the outer circumferential surface thereof. According to this embodiment, the ring 1 is fitted into a hole, as denoted by numeral 1' in FIG. 1, at its outer circumferential surface.

Figure 30:
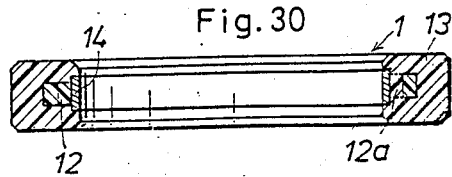

The embodiment shown in FIG. 30 is similar to that shown in FIG. 26 but the resinous magnetic ring 12 is embedded in the inner circumferential surface of a synthetic resin ring 13 instead of the outer circumferential surface thereof. According to this embodiment, the ring 1 is fitted into a hole, as denoted by numeral 1' in FIG. 1, at its outer circumferential surface, and the metallic ring 14 attached to the inner circumferential surface protects the resinous magnetic ring 12 on one hand and reinforces the ring 1 against the stress arising from press fitting and other external causes. Since this metallic ring 14 is made of non-magnetic material such as aluminum, it allows passage of magnetic flux therethrough.

FIG. 31 shows yet another embodiment of the present invention in which a plurality of gear teeth 12a is formed on an end surface of a ring 1 detecting the rotation of an object and, therefore, a magnetic sensor 38 comprising an iron core 39 made of a permanent magnet and a coil 40 wound thereon is disposed adjacent to the end surface of the ring 1. FIGS. 32 and 33 show the ring 1 of FIG. 31 in greater detail. According to this embodiment, a resinous magnetic ring 12 which is formed with a plurality of gear teeth 12a along its circumference is embedded in an end surface of a synthetic resin ring 13. If desired, the resinous magnetic ring 12 may be trapezoidal in cross section for positive attachment to the synthetic resin ring 1.

FIGS. 34 and 35 show yet another embodiment of the present invention. A ring 1 for detecting the rotation of an object according to the present invention comprises a resinous magnetic ring 12 which is made of a synthetic resin such as polyamide and ferromagnetic powder such as ferrite dispersed therein and is provided with a plurality of gear teeth along its outer circumferential surface. The toothed outer circumferential surface of the resinous magnetic ring 12 is surrounded by a metallic ring 14 for reinforcement. Since this metallic ring 14 reduces the deformation of the ring 1 when being press fitted, the resinous magnetic ring 12 is protected from any deterioration from excessive deformation. This metallic ring 14 is also helpful in preventing foreign material from being caught the gap between the teeth 12a or between the teeth 12a and a magnetic sensor. If desired, this whole assembly may be enclosed in synthetic resin material. Since this metallic ring 14 is made of non-magnetic material, it does not substantially affect the pattern of the magnetic field.

FIGS. 36 and 37 show an embodiment which is similar to that shown in FIGS. 34 and 35 but differs therefrom in that the gear teeth 12a are formed in the end surface, instead of the outer surface, of the resinous magnetic ring 12.

FIGS. 38 and 39 show another similar embodiment according to the present invention. A ring 1 for detecting the rotation of an object according to the present invention comprises a resinous permanent magnet ring 2 which is made of synthetic resin such as polyamide and ferromagnetic powder such as ferrite dispersed therein and is magnetized to have alternative magnetic poles along its circumference. The outer circumferential surface of the resinous permanent magnet ring 2 is surrounded by a metallic ring 4 for reinforcement. This metallic ring 4 is made of nonmagnetic material, it does not substantially affect the pattern of the magnetic field. If desired, this whole assembly may be enclosed in synthetic resin material. This ring 1 may be fitted either onto a shaft as denoted by numeral 1 in FIG. 1 or into a bore as denoted by numeral 1' in FIG. 1.

In the embodments shown in FIGS. 40 and 41, a metallic ring 14 having an L-shaped cross-section is attached to the outer circumferential and end surface of a resinous magnetic ring 12 having a plurality of gear teeth 12a along their outer circumferential surface and end surface, respectively. These rings 1 are adapted to be fitted into a bore as denoted by numeral 1' in FIG. 1 at their outer circumferential surfaces. The embodiment of FIG. 42 is similar to that shown in FIG. 40 but has a resinous permanent magnetic ring 2, which is magnetized to have alternating magnetic poles along its circumferential surface, instead of a resinous magnetic ring having gear teeth.

The embodiments shown in FIGS. 43, 44 and 45 are similar to those shown in FIGS. 40, 41 and 42, respectively, but metallic rings 14, 4 which are shaped like a letter-C cover not only the outer circumferential surfaces and one end surface of resinous magnetic rings 12 (FIGS. 43 and 44) and a resinous permanent magnet ring 2 (FIG. 45), respectively, but also the other end surfaces thereof.

The embodiments given in FIGS. 43 to 45 are adapted to be fitted into a bore as denoted by numeral 1' in FIG. 1, and the metallic rings 14, 4 ensure the mechanical strength that is required for press fitting.

According to the embodiments given in FIGS. 46, 47 and 48, metallic rings 14, 4 for reinforcement are attached only to the inner circumferential surfaces of resinous magnetic rings 12 (FIGS. 46 and 47) and a resinous permanent magnet ring 2 (FIG. 48), respectively.

The embodiments shown in FIGS. 49, 50 and 51 are similar to those shown in FIGS. 46, 47 and 48, respectively, but metallic rings 14, 4 which are shaped like a covers not only the inner circumferential surfaces of resinous magnetic rings 12 (FIGS. 49 and 50) and a resinous permanent magnet ring 2 (FIG. 51), respectively, but also the one end surfaces thereof.

The embodiments shown in FIGS. 52, 53 and 54 are similar to those shown in FIGS. 49, 50 and 51, respectively, but metallic rings 14, 4 which are shaped like a letter-C covers not only the inner circumferential surfaces and one end surface of resinous magnetic rings 12 (FIGS. 52 and 53) and a resinous permanent magnet ring 2 (FIG. 54), respectively, but also the other end surfaces thereof.

The embodiments given in FIGS. 49 to 54 are adapted to be fitted onto a shaft as denoted by numeral 1 in FIG. 1, and the metallic rings 14, 4 ensure the mechanical strength that is required for press fitting.

According to the embodiments given in FIGS. 55, 56 and 57, metallic rings 14, 4 cover both the inner and outer circumferential surfaces and the one end surfaces of resinous magnetic rings 12 (FIGS. 49 and 50) and a resinous permanent magnet ring 2 (FIG. 51), respectively. These embodiments are adapted to be fitted either onto a shaft or into a bore as denoted by numerals 1 or 1', as the case may be, in FIG. 1, and the metallic rings 14, 4 ensure the mechanical strength that is required for press fitting FIGS. 58, 59 and 60 show different embodiments in which the inner circumferential surfaces of resinous magnetic rings 12 are provided with gear teeth 12a, and metallic ring 14 cover the outer circumferential surface and/or the end surfaces and/or the other end surface of the resinous magnetic ring 12.

FIGS. 61, 62 and 63 show yet other embodiments of the present invention and metallic rings 14, 4 cover the one end surfaces of resinous magnetic rings 12 (FIGS. 61 and 62) and a resinous permanent magnetic ring 2 (FIG. 63), respectively. These embodiments are adapted to be fitted either onto a shaft or into a bore as denoted by numerals 1 or 1', as the case may be, in FIG. 1, and the metallic rings 14, 4 ensure the mechanical strength that is required for press fitting.

FIG. 64 shows yet another embodiment of the present invention. A resinous magnetic ring 32 of this embodiment consists of a pair of semicircular halves 32a and 32b which can be combined into a complete ring having a plurality of gear teeth 32c along its outer circumferential surface. These two halves of the ring 1 are held in place on a shaft S (shown in imaginary lines in FIGS. 64 and 65) with a metallic ring 24 which substantially covers the outer circumferential and end surface of the ring 1 as shown in FIG. 65.

FIGS. 66 and 67 show embodiments which are similar to that of FIGS. 64 and 65 but the embodiment of FIG. 66 has a resinous permanent magnet ring 22 which is magnetized into alternating magnetic poles along its circumference instead of a toothed magnetic ring and the embodiment of FIG. 67 has a toothed magnetic ring 32 having a plurality of gear teeth 32c along its end surface instead of its outer circumferential surface.

The embodiment shown in FIG. 68 comprises a synthetic resin ring 33 having an annular extension 33a and fitted onto a shaft S, a toothed resinous magnetic ring 32 embedded in the outer circumferential surface of the synthetic resin ring 33 and a metallic ring 24 which is similar to those shown in FIGS. 64 to 67 press fitted onto an annular extension 33a of the synthetic resin ring 33. The synthetic resin ring 33 as well as the toothed resinous magnetic ring 32 consist of a pair of semicircular halves, and the metallic ring 24 press fitted onto the extension 33a holds them together.

The embodiment shown in FIG. 69 is similar to that show in FIG. 68 but has a resinous permanent magnetic ring 22 which is magnetized to have alternating magnetic poles along its circumference, instead of a toothed ring, and is embedded in the outer circumferential surface of a synthetic resin ring 23. According to the embodiment shown in FIG. 70, a toothed resinous magnetic ring 32 having a plurality of gear teeth 32c along its end surface is embedded in an end surface of a synthetic resin ring 33 which is otherwise similar to that shown in FIG. 68.

The embodiment shown in FIG. 71 comprises a synthetic resin ring 33 consisting of a pair of semi circular halves 33a and 33b and a resinous magnetic ring 32 which is provided with gear teeth 32c along its inner circumferential surface and likewise consists of a pair of semicircular halves 32a and 32b which are embedded in the corresponding halves 33a and 33b of the synthetic resin ring 33. This ring 1 for detecting the rotation of an object is adapted to be press fitted into a bore B. The embodiment shown in FIG. 72 is similar to that shown in FIG. 71 but differs therefrom only in that it comprises a resinous permanent magnetic ring 22 which is magnetized to have alternating magnetic poles along its circumference, instead of a toothed magnetic ring.

Figure 73:
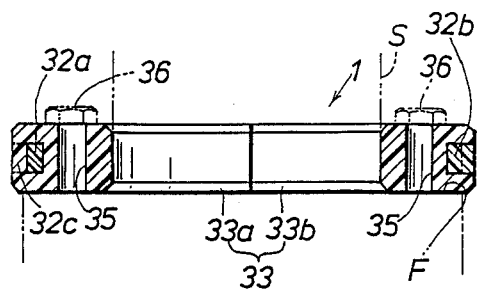

According to the embodiment shown in FIG. 73, the ring 1 for detecting the rotation of an object comprises a synthetic resin ring 33 consisting of a pair of semicircular halves 33a and 33b and a resinous magnetic ring 32 which is provided with gear teeth 32c along its outer circumferential surface and likewise consists of a pair of semicircular halves 32a and 32b which are embedded in the corresponding halves 33a and 33b of the synthetic resin ring 33. Furthermore, the synthetic resin ring 33 is provided with a plurality of axial through holes 35 and can be secured to a shoulder surface or a shoulder surface F with threaded bolts 36 passed through these holes 35. According to this embodiment, the ring 1 is fitted onto a shaft S but need not be tightly fitted as was the case in previous embodiments.

Figure 74:
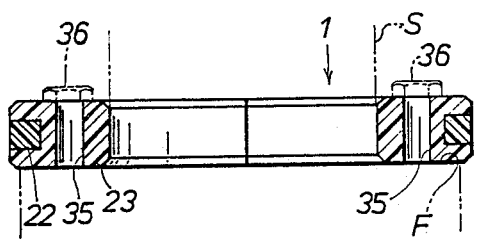

The embodiment shown in FIG. 74 is similar to that shown in FIG. 73 but differs therefrom only in that it comprises a resinous permanent magnet ring 22 which is magnetized to have alternating magnetic poles along its circumference, instead of a toothed magnetic ring.

Figure 75:
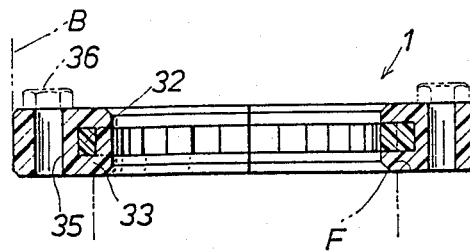
Figure 76:
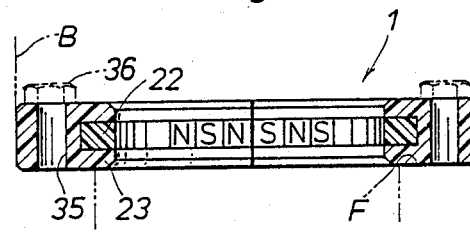

The embodiments shown in FIGS. 75 and 76 are similar to those shown in FIGS. 73 and 74, respectively, but differ therefrom in that they are fitted into bores B, instead of being fitted onto shafts.

Figure 77:
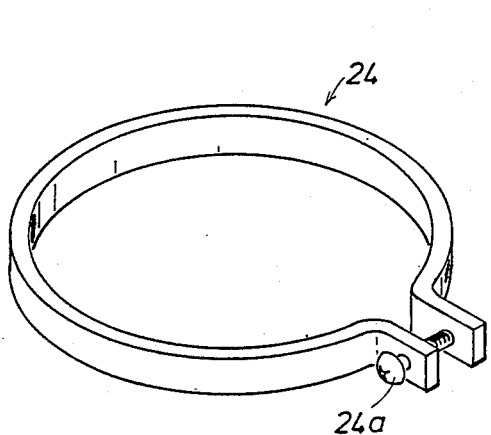
FIG. 77 is a perspective view of a fastener which may be used to combine the two halves of the magnetic ring according to the present invention.

FIG. 77 shows an embodiment of a metallic ring 24 which can be used to fasten together a pair of halves into a complete ring by tightening a screw 24a which is passed through the two ends of the metallic ring 24. This metallic ring 24 can be conveniently applied to the embodiments shown in FIGS. 67 to 70.

Figure 78:
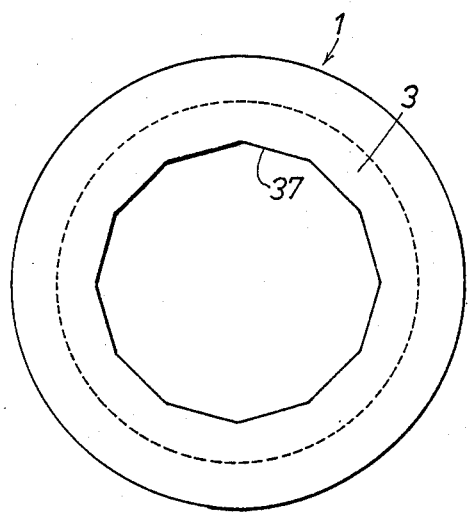
FIG. 78 is a plan view of a magnetic ring having a polygonal inner circumferential surface according to the present invention.

FIG. 78 is a plan view of a ring 1 for generating a magnetic signal in which the inner circumferential surface 37 of a synthetic resin ring 3 is formed into a polygonal shape so as to prevent a relative free rotation between the ring 1 and a corresponding member for press fitting.

Since the ring for generating a magnetic signal according to the present invention makes use of resinous material, it is suitable for mass production and light in weight, and, since it is reinforced by a ring member which has a great mechanical strength, it would not be damaged when press fitted. Furthermore, since the pressure it exerts upon the rotating member after press fitting is appropriate, the rotating member will be not deformed and no great care is necessary for adjusting the dimensions involved in press fitting, thereby improving the facility of manufacture.

Although the present invention has been shown and described with reference to the preferred embodiments thereof, they should not be considered as limited thereby. Various possible modifications and alterations could be conceived of by one skilled in the art to any particular embodiment, without departing from the scope of the invention.

What we claim is:

1. A ring to be attached to a rotating body for producing a magnetic signal in cooperation with a magnetic sensor relative to which the rotating body rotates, comprising:
   a magnetic ring member having an alternating magnetic property along its circumference consisting of synthetic resin in which magnetic material is dispersed; and
   a reinforcement ring member which is made of synthetic resin material and substantially surrounds the magnetic ring member.

2. A ring as defined in claim 1, wherein the magnetic ring member is magnetized to have alternating magnetic poles along its circumferential surface.

3. A ring as defined in claim 1, wherein the magnetic ring member is provided with a plurality of teeth along its circumferential surface.

4. A ring as defined in claim 2 or 3, wherein the magnetic ring member is embedded in the reinforcement ring member in a partially exposed state.

5. A ring as defined in claim 4, wherein the ring is further reinforced by a metallic ring which covers the exposed surface of the magnetic ring member.

6. A ring as defined in claim 2 or 3, wherein the magnetic ring member is wholly enclosed in the reinforcement ring member.

7. A ring as defined in claim 2 or 3, wherein the reinforcement ring member made of synthetic resin comprises a main body and an extension, and the main body carries the magnetic ring member while the extension is 8. A ring as defined in claims 2 or 3, wherein the magnetic ring member is embedded in the reinforcement ring member with a buffer member interposed therebetween.

9. A ring as defined in claim 1, wherein a circumferential surface of the ring for attachment to the rotating body is shaped as a polygonal surface.

10. A ring to be attached to a rotating body for producing a magnetic signal in cooperation with a magnetic sensor relative to which the rotating body rotates, comprising:
    a magnetic ring member having an alternating magnetic property along its circumference consisting of synthetic resin in which magnetic material is dispersed; and
    a reinforcement ring member which is made of metal and extends along the circumference of the magnetic ring member.

11. A ring as defined in claim 10, wherein the magnetic ring member is magnetized to have alternating magnetic poles along its circumferential surface.

12. A ring as defined in claim 10, wherein the magnetic ring member is provided with a plurality of teeth along its circumferential surface.

13. A ring to be attached to a rotating body for producing a magnetic signal in cooperation with a magnetic sensor relative to which the rotating body rotates, comprising:
    a magnetic ring member having an alternating magnetic property along its circumference which comprises at least two arcuate parts, forming a complete circle through mutual cooperation thereof, consisting of synthetic resin in which magnetic material is dispersed; and
    a fastening means for holding the arcuate parts together in the state of a complete ring.

14. A ring as defined in claim 13, wherein the fastening means comprises a reinforcement ring which extends along a whole circumferential surface of the magnetic ring member.

15. A ring as defined in claim 13 or 14, wherein the magnetic ring member is reinforced by reinforcement arcuate members made of synthetic resin which substantially surrounds the arcuate parts of the magnetic ring member.

16. A ring as defined in claim 15, wherein each of the reinforcement arcuate members comprises a main body and an extension each of which forms a part of a complete circular part, and the arcuate parts of the magnetic ring member are embedded in the main bodies of the reinforcement arcuate members while the fastening means extends along the circumferential surface of the extensions of the reinforcement arcuate members.

17. A ring to be attached to a rotating body for producing a magnetic signal in cooperation with a magnetic sensor relative to which the rotation body rotates, comprising:

a magnetic ring member having an alternating magnetic property along its circumference consisting of synthetic resin in which magnetic material is dispersed; and a reinforcement ring member which is made of alloy material and extends along the circumference of the magnetic ring member.

18. A ring as defined in claim 17, wherein the magnetic ring member is magnetized to have alternating magnetic poles along its circumferential surface.

19. A ring as defined in claim 17, wherein the magnetic ring member is provided with a plurality of teeth along its circumferential surface.

* * * * *